United States Patent
Rüdiger Lilienthal et al.

(10) Patent No.: US 11,370,605 B2
(45) Date of Patent: Jun. 28, 2022

(54) RELIEF MODULE AND DEVICE FOR UNLOADING BULK MATERIAL

(71) Applicant: TMSA—TECNOLOGIA EM MOVIMENTAÇÃO S.A., Porto Alegre (BR)

(72) Inventors: Klaus Rüdiger Lilienthal, Porto Alegre (BR); Jefferson Küchle, Porto Alegre (BR)

(73) Assignee: TMSA—Tecnologia em Movimentação S.A., Porto Alegre (BR)

(*) Notice: Subject to any disclaimer, the term of this patent is extended or adjusted under 35 U.S.C. 154(b) by 0 days.

(21) Appl. No.: 17/296,063

(22) PCT Filed: Nov. 25, 2019

(86) PCT No.: PCT/BR2019/000041
§ 371 (c)(1),
(2) Date: May 21, 2021

(87) PCT Pub. No.: WO2020/102866
PCT Pub. Date: May 28, 2020

(65) Prior Publication Data
US 2022/0017296 A1    Jan. 20, 2022

(30) Foreign Application Priority Data
Nov. 23, 2018  (BR) .......................... 102018074121-7

(51) Int. Cl.
*B65D 88/28*    (2006.01)
*B65D 90/54*    (2006.01)
(Continued)

(52) U.S. Cl.
CPC .......... *B65D 88/28* (2013.01); *B65D 90/545* (2013.01); *B65G 47/44* (2013.01); *B65G 69/18* (2013.01);
(Continued)

(58) Field of Classification Search
CPC .. B65D 88/28; B65D 90/545; B65D 2590/54; B65G 47/44; B65G 69/18; B65G 69/183;
(Continued)

(56) References Cited

U.S. PATENT DOCUMENTS 2,788,809 A * 4/1957 Paton ................... B65D 90/626
                                                                          141/370
3,602,400 A * 8/1971 Cooke .................. B65D 88/128
                                                                          222/143

(Continued)

FOREIGN PATENT DOCUMENTS

CN       103264850 A    8/2013
CN       204624749 U    9/2015
(Continued)

OTHER PUBLICATIONS

International Search Report & Written Opinion for PCT/BR2019/000041, dated Dec. 13, 2019.

*Primary Examiner* — Vishal Pancholi
(74) *Attorney, Agent, or Firm* — Pilloff Passino & Cosenza LLP; Sean A. Passino; Rachel K. Pilloff

(57) ABSTRACT

The present invention proposes a relief module comprising a tubular body (10) for the passage of bulk material, at least a lateral opening (12) in the tubular body (10), a window (20) to cover the respective lateral opening (12), the window (20) operating in a closed position preventing the bulk material from exiting through the lateral opening (12) or in an open position allowing the material to exit through the lateral opening (12), the window (20) having at least one portion made of filtering material allowing the air to pass through and retain solid particles, when the window (20) is in the closed position. The present invention also proposes a bulk material discharge device which receives the bulk material from a feeding system and discharges the bulk (Continued)

material to a destination, the discharge device comprising a relief module configured according to the invention.

15 Claims, 5 Drawing Sheets

(51) Int. Cl.
*B65G 47/44* (2006.01)
*B65G 69/18* (2006.01)

(52) U.S. Cl.
CPC ......... *B65G 69/183* (2013.01); *B65G 69/185* (2013.01); *B65D 2590/54* (2013.01)

(58) Field of Classification Search
CPC .. B65G 69/185; B65G 2207/40; B65G 47/36; B65G 65/34
See application file for complete search history.

(56) References Cited

U.S. PATENT DOCUMENTS

| | | | |
|---|---|---|---|
| 4,410,111 A | 10/1983 | Barger | |
| 5,626,253 A * | 5/1997 | Schutz | B65D 90/626 |
| | | | 222/509 |
| 7,712,632 B2 * | 5/2010 | Schwass | B65G 47/19 |
| | | | 222/65 |
| 9,862,551 B2 * | 1/2018 | Oren | B65G 69/185 |
| 2007/0114240 A1 | 5/2007 | Schwass | |
| 2018/0148272 A1* | 5/2018 | Wagner | B65G 47/12 |

FOREIGN PATENT DOCUMENTS

| | | |
|---|---|---|
| CN | 105621120 A | 6/2016 |
| WO | 2016128813 A1 | 8/2016 |

* cited by examiner

RELIEF MODULE AND DEVICE FOR UNLOADING BULK MATERIAL

TECHNICAL FIELD

The present invention refers to a relief module and a solid bulk material discharge device.

STATE OF THE ART

The storage and transport of solid bulk material, such as grains, minerals, among others, has been used on a large scale. In this context are included bulk material transfer operations from one point to another, such as, for example, from a storage site to a means of transport and vice-versa. For example, the bulk material transfer operation from a warehouse to a truck or from a warehouse to a bulk carrier ship, with the aid of conveyor equipment, such as a belt conveyor, ship loader, among others.

Such operations normally include a vertical discharge operation where the bulk material is discharged from a discharge point to a destination, developing a drop from height. For example, in a ship loader, the bulk material is discharged from a telescopic tube discharge point, following a drop from height until it reaches the ship hold.

Conventionally, a bulk material vertical discharge operation results in a large quantity of dust being launched to the environment. In this context, there are bulk material discharge devices configured to reduce the launch of dust to the environment, as is the case of the dust suppression hopper described in U.S. Pat. No. 7,712,632, which is essentially formed by a rigid structure, a Hopper with a bottom outlet opening, the hopper being connected to the rigid structure by means of springs, and a valve body attached to the rigid structure and cooperating with the bottom outlet opening. The springs tension the hopper against the valve body in such a way to define a closed position to the bottom outlet opening. When the bulk material enters the hopper, the bulk material weight, by overcoming the force of the springs, causes a displacement downwards in the hopper, consequently defining an open position which allows the bulk material to be discharged from the bottom outlet opening. Thus, this discharge device allows a bulk material discharge flow similar to that of a solid column, minimizing the launch of dust through the bottom outlet opening.

WO2016128813 discloses a bulk material discharge device similar to the one described in U.S. Pat. No. 7,712,632, except that in the device covered by WO2016128813 the hopper is attached to the rigid structure, and the valve body is attached to the rigid structure on a moving manner.

When such discharge devices, and other discharge devices in general, are connected to a closed bulk material feeding system, for example, a telescopic tube or an enclosed belt conveyor, the dust may accumulate in suspension inside the discharge device and adjacent system, representing an inconvenience when considering the explosive potential of the dust in suspension resulting from most of the bulk materials. In addition, the discharge devices are subject to clogging, for example, caused by the presence of a strange body within the bulk material, leading to the obstruction of the bulk material discharge and, consequently, the accumulation of bulk material inside the discharge device and adjacent system, causing an undesired overload to the assembly formed by the discharge device and adjacent feeding system.

SUMMARY OF THE INVENTION

In order to mitigate the inconveniences of the state of the art, the present invention proposes a relief module and a bulk material discharge device comprising a relief module. According to the invention, the relief module comprises a tubular body intended for the passage of the bulk material, at least a lateral opening in the tubular body, a window to cover the respective lateral opening, the window operating in a closed position preventing the bulk material from exiting through the lateral opening or in an open position allowing the material to exit from the lateral opening, the window having at least one portion made of filtering material allowing the air to pass through and retain solid particles, when the window is in the closed position. According to the invention, the discharge device receives the bulk material from a feeding system and discharges the bulk material to a destination, the discharge device comprising a relief module as defined above.

When in operation, the filtering portion of the relief module window allows the air exhaust and retention of the solid particles contained in the relief module and/or discharge device, thus advantageously reducing the quantity of dust in suspension contained in the relief module and/or discharge device, consequently reducing the risk of explosion. At the same time, in case the discharge device is clogged due to the discharge obstruction, the bulk material accumulates inside the discharge device until a certain level of bulk material falls upon the window and exerts a force against the window that is higher than the force opposite to opening the window, causing the opening of the window from the closed position to an open position, allowing the bulk material to exit through the lateral opening. Advantageously, the window opening prevents the bulk material from accumulating above the window position, consequently, eliminating the possibility of overloading in the discharge device and in the adjacent feeding system.

BRIEF DESCRIPTION OF THE FIGURES

The invention will be better understood with the description detailed below, which will be better interpreted with the help of the figures, namely.

DETAILED DESCRIPTION OF THE INVENTION

Figure 1:
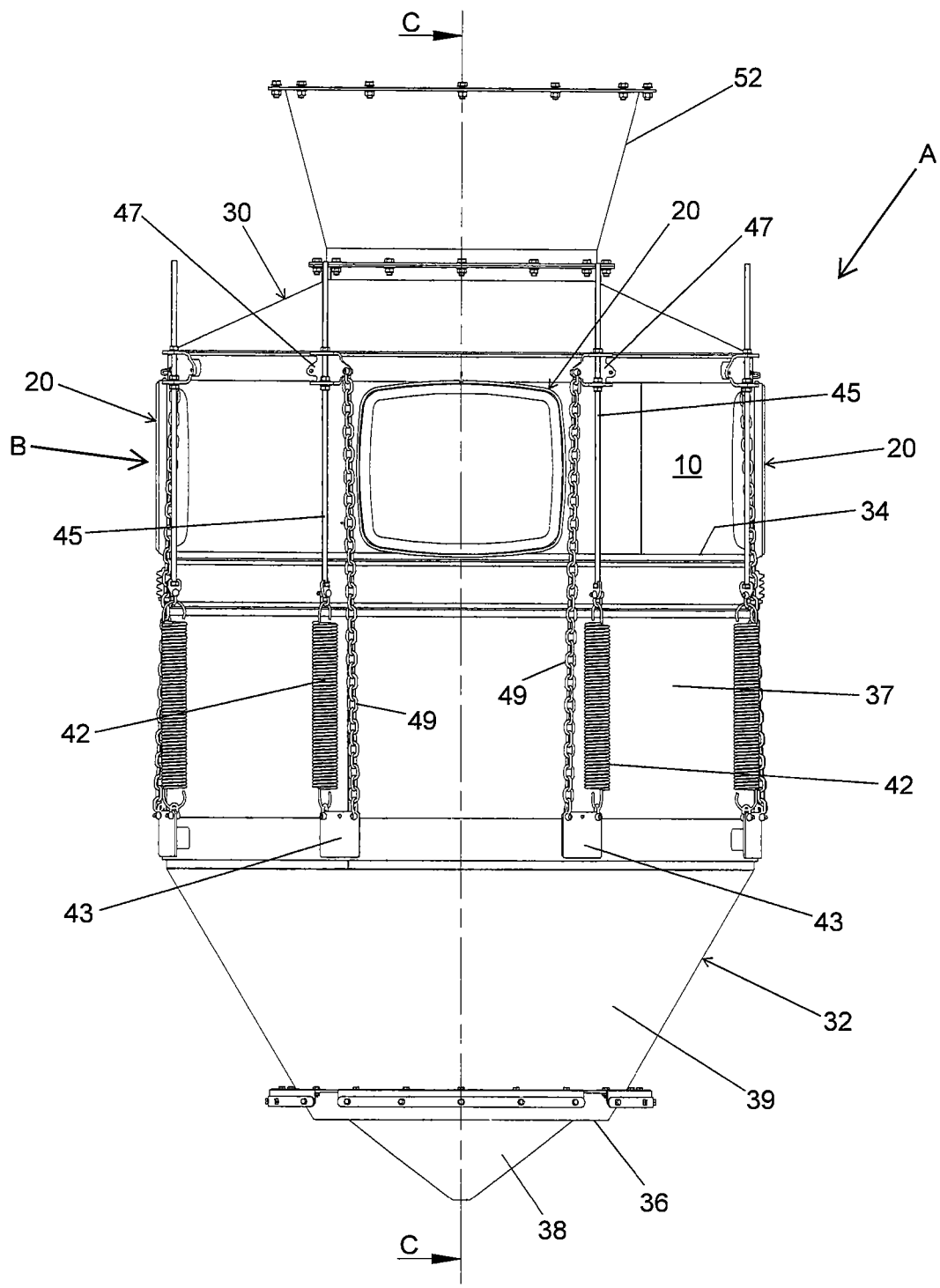
FIG. 1 show a front view of an embodiment of the discharge device comprising the incorporation of a relief module according to the invention.
Figures 2, 3:
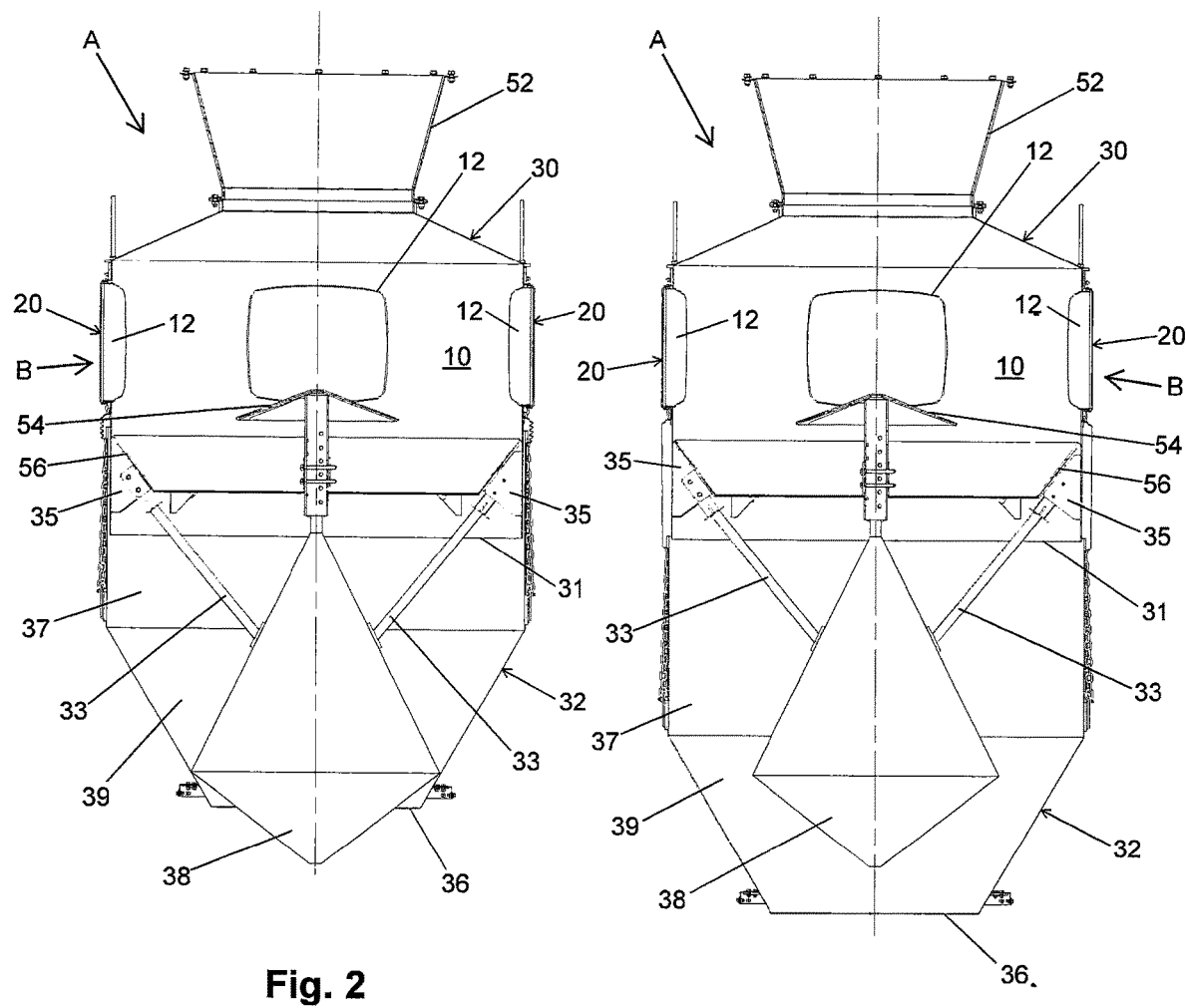
FIG. 2 shows a sectional view according to the C-C sectional plane indicated in FIG. 1, with the discharge device in the closed position.
FIG. 3 shows a sectional view according to the C-C sectional plane indicated in FIG. 1, with the discharge device in the open position.

The invention proposes a relief module and a bulk material discharge device comprising a relief module. FIGS. 1 to 3 show an embodiment of a discharge device (A) comprising an incorporation of a relief module (B). The discharge device (A) receives the bulk material from a feeding system, preferably an enclosed feeding system and discharges the bulk material to a destination. It is noted that the relief module (B) proposed by the invention can be used in association with different types of discharge devices, without being limited to the embodiment of the shown discharge device (A).

According to the invention, the relief module (B) comprises a tubular body (10) intended for the passage of the bulk material, at least a lateral opening (12) in the tubular body (10), a window (20) to cover the respective lateral opening (12), the window (20) operating in a closed position preventing the bulk material from exiting through the lateral opening (12) or in an open position allowing the material to exit through the lateral opening (12), the window (20) having at least one portion made of filtering material allowing the air to pass through and retain solid particles, when the window (20) is in the closed position.

In the represented embodiment, the relief module (B) has four lateral openings (12) distributed on an equidistant manner over the perimeter of the cross-sectional section of the tubular body (10), each of the lateral openings (12) receiving a respective window (20). The description below is conducted for a lateral opening (12) and a respective window (20), being, however, equivalent to the other lateral openings (12) and windows (20) present in the relief module (B).

The relief module (B) is configured to provide an opening of the window (20) from the closed position to the open position when a certain level of bulk material contained in the tubular body (10) falls upon the window (20) and exerting a force against the window (20) that is higher than the force opposite to opening the window (20).

When in operation, the filtering portion of the relief module (B) window (20) allows the air exhaust and retention of the solid particles contained in the relief module (B) and/or discharge device (A), thus advantageously reducing the quantity of dust in suspension contained in the relief module (B) and/or discharge device (A), consequently reducing the risk of explosion. At the same time, in case the discharge device (A) is clogged due to the discharge obstruction, the bulk material accumulates inside the discharge device (A) until a certain level of bulk material falls upon the window (20) and exerts a force against the window (20) that is higher than the force opposite to opening the window (20), causing the opening of the window (20) from the closed position to the open position, allowing the bulk material to exit from the lateral opening (12). Advantageously, the opening of the window (20) prevents the bulk material from accumulating above the window (20) position, consequently, eliminating the possibility of overloading in the discharge device (A) and in the adjacent feeding system.

Preferably, the window (20) is fully made of filtering material, more preferably of flexible filtering material. For example, the filtering material may correspond to a textile material, such as porous fabric or felt, for example, of synthetic fibers, such as polyester or polytetrafluoroethylene. For example, a filtering material made of felt with grammage of 300 g/m$^2$ with 99.9% efficiency to retain solid particles of 50 µm or higher and air-to-cloth ratio of 1 m$^3$/m$^2$/min.

Figure 4:
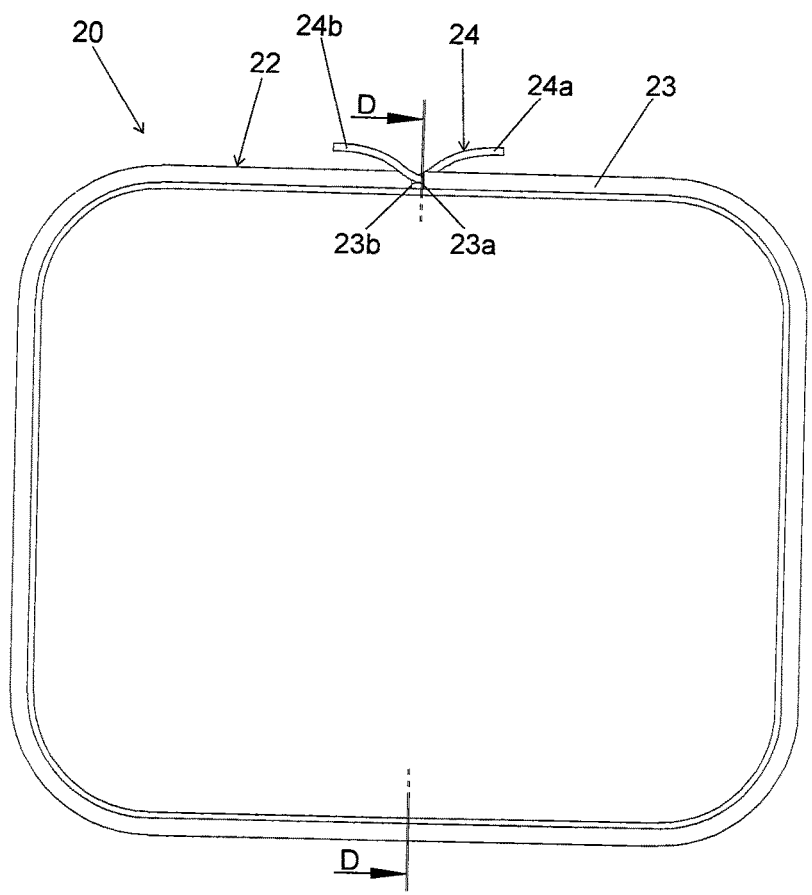
FIG. 4 shows a front view of a window.
Figure 5:
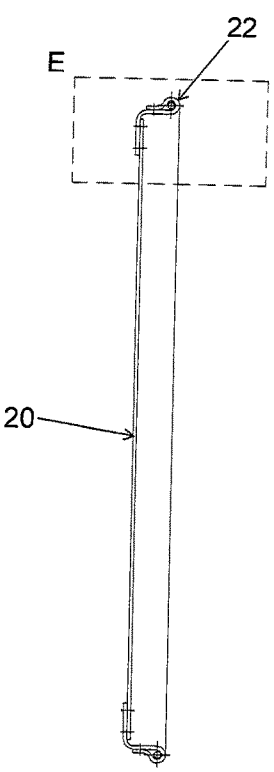
FIG. 5 shows a sectional view according to the D-D sectional plane indicated in FIG. 4.
Figure 6:
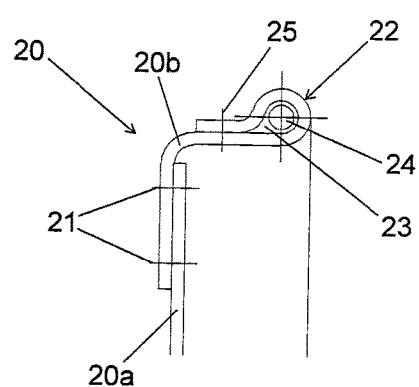
FIG. 6 shows a detail according to area E indicated in FIG. 5.

Preferably, as it can be seen in FIGS. 4 to 6, the window (20) has an edge (22), the edge (22) having a housing (23) with a pair of openings (23a, 23b) through which a rope (24) is passed, the rope (24) presenting a pair of extremities (24a, 24b) positioned outwards the openings (23a, 23b) of the housing (23). For example, as it can be better seen in FIG. 6, the window (20) can be formed by a central portion (20a) joined to a peripheral portion (20b) by means of traced sewing (21). For example, as it can be better seen in FIG. 6, the housing (23) can be formed by a fold in the edge (22) joining a folded portion with an unfolded portion by means of a traced sewing (25).

Figure 7:
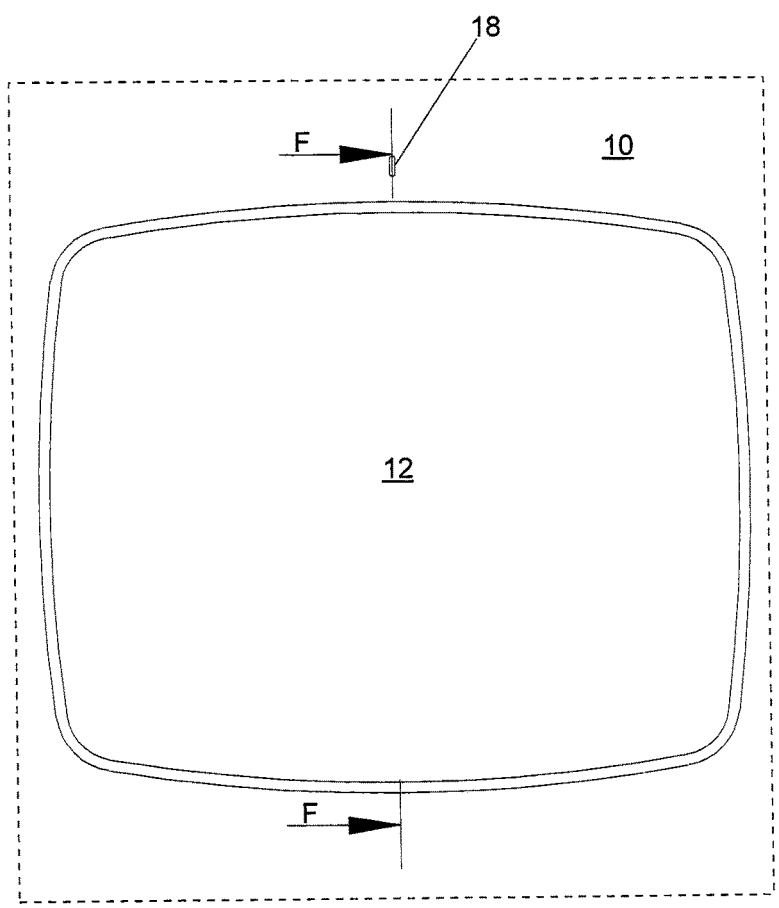
FIG. 7 shows a front view of a lateral opening of the relief module.
Figure 8:
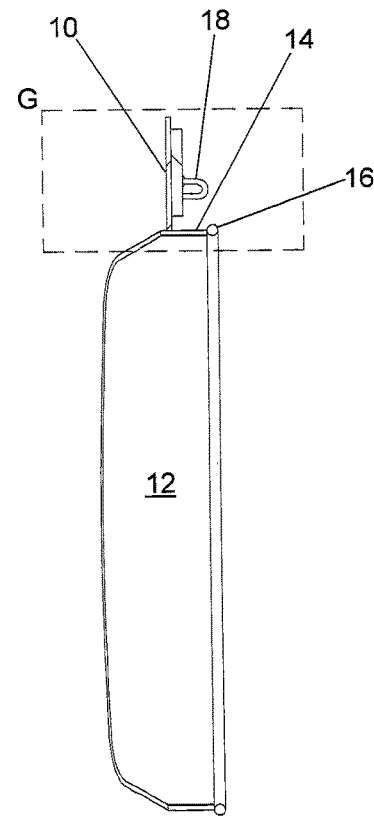
FIG. 8 shows a sectional view according to the F-F sectional plane indicated in FIG. 7.
Figure 9:
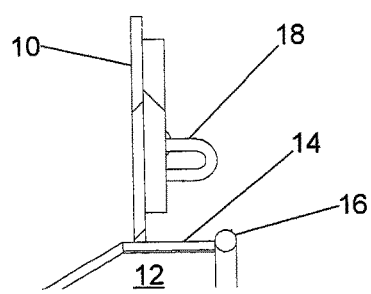
FIG. 9 shows a detail according to area G indicated in FIG. 8.

Preferably, as it can be better viewed in FIGS. 7 to 9, the relief module (B) comprises a flap (14) positioned around the lateral opening (12) and extended outwards the tubular body (10), the flap (14) having an external surface with a protrusion (16). For example, the flap (14) can be formed by a plate welded around the lateral opening (12) and the protrusion (16) can be formed by a round bar welded in the free extremity of the flap (14).

Figure 10:
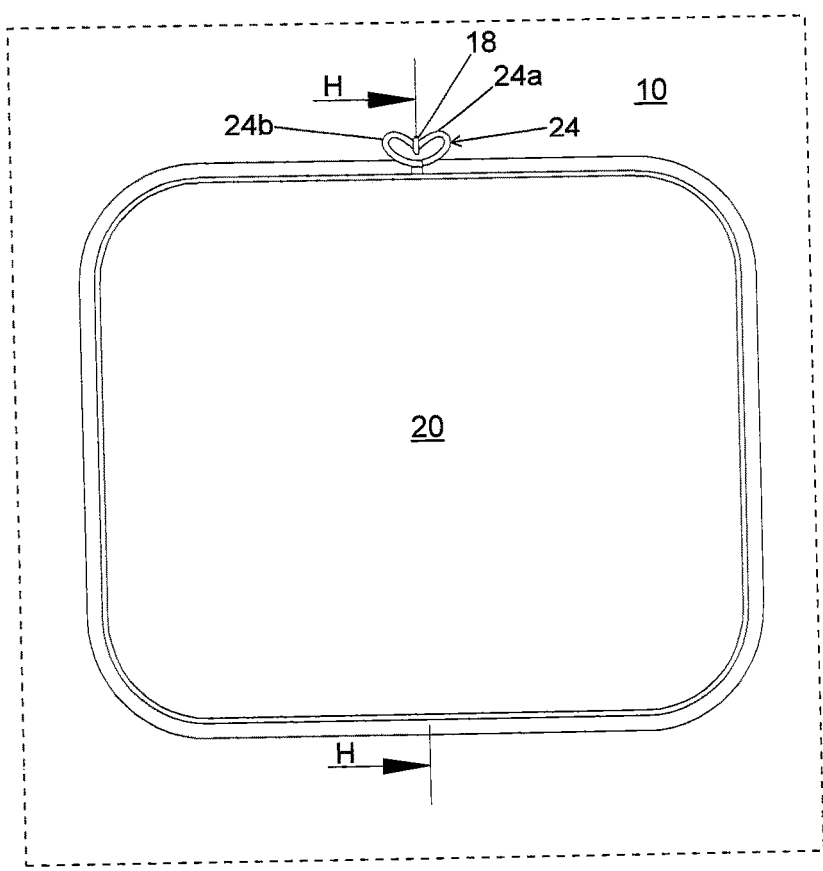
FIG. 10 shows a front view of the window in the closed position over the lateral opening.
Figure 11:
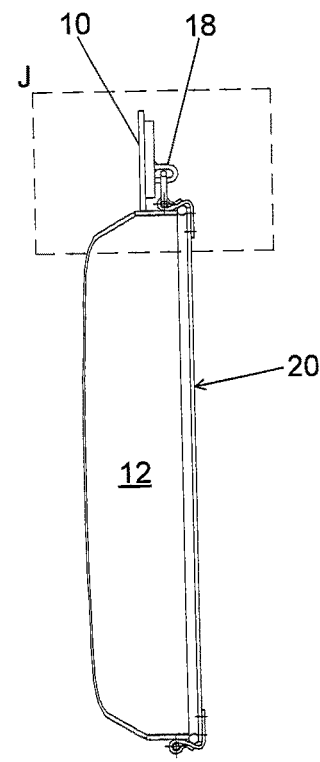
FIG. 11 shows a sectional view according to the H-H sectional plane indicated in FIG. 10.
Figure 12:
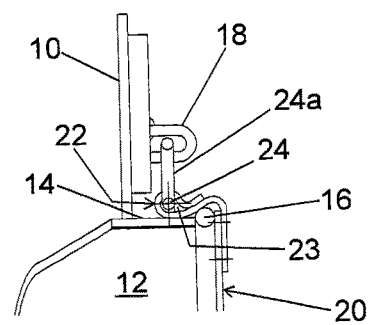
FIG. 12 shows a detail according to area J indicated in FIG. 11.

Preferably, as it can be better viewed in FIGS. 10 to 12, the closed position of the window (20) is defined by tensioning the edge (22) of the window (20) against the flap (14) of the lateral opening (12), by tying up the rope (24) around the flap (14), the rope (24) being positioned between the tubular body (10) and the protrusion (16) of the flap (14), said tensioning creating a force opposite to releasing the window (20) with respect to the protrusion (16). Preferably, the relief module (B) has a ring (18) attached to the tubular body (10), the ring (18) used to receive the tying of the extremities (24a, 24b) of the rope (24), attaching the window (20) to the ring (18). In FIGS. 10 to 12, the extremities (24a, 44b) of the rope (24) are shown tied up to the ring (18) on a schematic manner.

Preferably, the open position of the window (20) is defined by the release of the window (20) with respect to the protrusion (16) of the flap (14) of the lateral opening (12) which occurs when the force exerted by the bulk material against the window (20) is higher than the force opposite to opening the window (20).

Preferably, as it can be viewed in FIG. 7, the lateral opening (12) has a super-elliptical shape, the flap (14) and the window (20) having a substantially corresponding shape. Such super-elliptical shape is advantageous once it provides the tying of the rope (24) around the flap (14) which produces a uniform tensioning of the edge (22) of the window (20) against the said flap (14), simultaneously providing a good lateral opening (12) area with larger size in the circumferential direction and lower size in the vertical direction, allowing the relief module (B) to be compact in terms of height. Alternatively, the lateral opening (12) may have a rectangular shape with round, elliptical or circular corners.

In the represented embodiment, as it can be viewed in FIGS. 1 to 3, the discharge device (A) comprises a rigid structure (30), a hopper (32) connected to the rigid structure (30), the hopper (32) formed by a wall having a top inlet opening (34) and a bottom outlet opening (36), a valve body (38) connected to the rigid structure (30) and located on a centralized manner inside the hopper (32), and displacement means providing a relative movement between the hopper (32) and the valve body (38) in such a way to define a closed position on which the valve body (38) is in contact with the wall of the hopper (32), preventing the discharge of bulk material through the bottom outlet opening (36), and an open position where the valve body (38) is away from the wall of the hopper (32), allowing the bulk material to be discharged through the bottom outlet opening (36). More particularly, in the represented embodiment, the wall of the hopper (32) has a cylindrical segment (37) followed by a tapered segment (39).

In the represented embodiment, the rigid structure (30) of the discharge device (A) includes a tubular structure and the tubular body (10) of the relief module (B) constitutes a tubular segment incorporated to the tubular structure of the rigid structure (30) of the discharge device (A). Alternatively, the relief module (B) tubular body (10) can be joined to the tubular structure of the discharge device (A), for example, by means of a screwed flange joint.

In the represented embodiment, the displacement means include the hopper (32) connected to the rigid structure (30) on a moving manner and the valve body (38) connected to the rigid structure (30) on a fixed manner. Preferably, the hopper (32) is connected to the rigid structure (30) by means of springs (42) tensioning the hopper (32) against the valve body (38). In the represented embodiment, as it can be better viewed in FIGS. 2 and 3, the valve body (38) is connected to the rigid structure (30) by means of rods (33) attached to internal brackets (35) present in the rigid structure (30). In the represented embodiment, as it can be better viewed in FIGS. 2 and 3, the valve body (38) has a biconical shape. Alternatively, the valve body (38) may have a bulb, warhead, spherical, tapered shape, among others.

In the represented embodiment, as it can be viewed in FIGS. 1 to 3, the top inlet opening (34) of the hopper (32) overlaps the bottom outlet opening (31) of the tubular structure of the rigid structure (30), i.e., the bottom outlet opening (31) of the tubular structure of the rigid structure (30) fits inside the top inlet opening (34) of the hopper (30). Alternatively, the bottom outlet opening (31) of the tubular structure of the rigid structure (30) can be connected to the upper inlet opening (34) of the hopper (32) by means of a flexible tubular element, such as, for example, a pleated tubular element, for example, made of rubber.

More particularly, in the represented embodiment, the springs (42) are of traction spring type and each spring (42) has a bottom extremity connected to a respective bottom bracket (43) attached to the hopper (32) and a top extremity connected to a threaded bar (45) attached to a respective top bracket (47) attached to the rigid structure (30). In the represented embodiment, as it can be better viewed in FIG. 1, there are chains (49) attached to a respective top bracket (47) and a respective bottom bracket (43). When the chains (49) are stretched, said chains (49) pose an end of course to the vertical downward movement of the hopper (32). It should be understood that the chains (49) are represented on a schematic manner in FIG. 1, considering that the discharge device (A) is represented in the closed position, i.e., in this position the chains (49) must not be stretched, so as to allow the vertical downward movement of the hopper (32) towards the open position.

Alternatively, according to a non-represented embodiment, the springs can be of compression spring type. In this case, for example, the rigid structure (30) supports a rod with and intermediate stop and a bottom stop, and a bracket attached to the hopper (32) is connected on a moving manner to the rod, between the intermediate stop and the bottom stop, being that a respective compression spring in inserted around the rod, the compression spring having a bottom extremity in contact with the bottom stop and a top extremity in contact with the bracket attached to the hopper (32), so as to tension the bracket attached to the hopper (32) against the intermediate stop and, therefore, tensioning the hopper (32) against the valve body (38).

In the beginning of a discharge operation, the discharge device (A) is in the closed position with the valve body (38) in contact with the wall of the hopper (32), as it can be viewed in FIG. 2, due to the action of the spring (42) which tension the hopper (32) against the valve body (38). The discharge device (A) is moved to the open position, as it can be viewed in FIG. 3, as the bulk material enters the discharge device (A). This occurs due to the bulk material weight, by overcoming the force of the springs (42) causing a downward movement in the hopper (32) moving the wall of the hoper (32) away with respect to the valve body (38) and allowing the bulk material discharge through the bottom outlet opening (36). Thus, the discharge device (A) provides a bulk material discharge flow similar to that of a solid column, minimizing the launch of dust through the bottom outlet opening (36).

During the discharge operation, the filtering portion of the windows (20) of the relief module (B) allows the air exhaust and retention of the solid particles contained in the discharge device (A), thus advantageously reducing the quantity of dust in suspension contained in the discharge device (A), consequently reducing the risk of explosion. At the same time, in case the discharge device (A) is clogged resulting in the discharge being interrupted through the bottom outlet opening (36), the bulk material accumulates inside the discharge device (A) until a certain level of bulk material falls upon the window (20) and exerts a force against the windows (20) that is higher than the force opposite to opening the windows (20), causing the opening of the windows (20) with respect to the protrusions (16) of the flaps (14) of the lateral openings (12), allowing the bulk material to exit through the lateral openings (12). Advantageously, the opening of the windows (20) prevents the bulk material from accumulating above the windows (20) position, consequently, eliminating the possibility of overloading in the discharge device (A) and in the adjacent feeding system.

When the windows (20) are released with respect to the protrusions (16) of the flaps (14) of the lateral openings (12), the windows (20) are suspended with the release module (B), due to the fact that the ropes (24) of the windows (20) are tied up to the rings (18) attached to the tubular body (10), what advantageously prevents the windows (20) from falling on the already discharged bulk material, preventing the windows (20) from being eventually lost.

Alternatively, according to a non-represented embodiment, the displacement means include the hopper (32) connected to the rigid structure (30) on a fixed manner and the valve body (38) connected to the rigid structure (30) on a moving manner. In this case, for example, the discharge device can be configured as the embodiments described in WO2016128813, said document incorporated herein by reference. More particularly, the hopper (32) can be configured as an extension of the tubular structure of the rigid structure (30), and the relief module (B) may constitute a tubular segment integrated to the discharge device tubular structure. Alternatively, the relief module (B) can be joined to the discharge device tubular structure, for example, by means of a screwed flange joint. The valve body (38) can be connected to the rigid structure (30) by means of a threaded rod, the valve body (38) being sliding in the threaded rod and retained in a desired position being attached by using a nut. Alternatively, the valve body (38) can be connected to the rigid structure (30) by means of a pneumatic cylinder, the valve body (38) being attached a pneumatic cylinder rod.

Alternatively, the valve body (38) can be connected to the rigid structure (30) by means of a moving vertical threaded rod activated by a transmission and electric motor set. When in operation, the filtering portion of the windows (20) of the relief module (B) provide the air exhaust and retention of the solid particles contained in the discharge device, at the same time that, in case of obstruction of the bulk material discharge through the bottom outlet opening (36) of the discharge device, the opening of the windows (20) from the closed position to the open position allows the bulk material to exit through the lateral openings (12) of the relief module (B).

Preferably, as it can be viewed in FIGS. 1 to 3, the discharge device (A) comprises a tubular inlet nozzle (52) with inclined walls converging towards a central region, a chinese hat (54) located in the central region over the valve body (38) and a deflector flap (56) extended on an inclined manner from the rigid structure (30) towards the valve body (38). The assembly formed by the tubular inlet nozzle (52), chinese hat (54) and deflector flap (56) mitigates the fall of bulk material over the walls of the hopper (32), advantageously contributing for the maintenance of a homogeneous discharge flow through the bottom outlet opening (36). In the represented embodiment, the tubular inlet nozzle (52) is joined to the tubular structure of the rigid structure (30) by means of a screwed flange joint. In the represented embodiment, the chinese hat (54) is attached to a vertical bracket protruding from the valve body (38). In the represented embodiment, the deflector flap (56) is supported on the internal brackets (35).

In the represented embodiment, the tubular body (10) of the discharge device (A) and the tubular structure of the rigid structure (30) of the discharge device (A) has a round cross-sectional section. Alternatively, said tubular body (10) and said tubular structure may have another cross-sectional section shape, such as, for example, square cross-sectional section.

According to another embodiment of the invention, the discharge device can be configured as a tubular structure comprising at least one open-close valve, operated by means of an electric, pneumatic or hydraulic actuator, for example, as a result of the signal of sensors which detect the presence of bulk material, to regulate the discharge of bulk material, such as, for example, described in BRPI0306548, said document incorporated herein by reference. More particularly, the relief module (B) may constitute a tubular segment integrated to the tubular structure of the discharge device. Alternatively, the relief module (B) can be joined to the tubular structure of the discharge device, for example, by means of a screwed flange joint. When in operation, the filtering portion of the windows (20) of the relief module (B) provide the air exhaust and retention of the solid particles contained in the discharge device, at the same time that, in case of obstruction of the bulk material discharge through the bottom outlet opening of the discharge device, the opening of the windows (20) from the closed position to the open position allows the bulk material to exit through the lateral openings (12) of the relief module (B).

The preferential or alternative embodiments described herein do not have the power to limit this invention to the structural forms, being that there may be constructive variations which are equivalent without, however, depart from the invention scope of protection.

The invention claimed is:

1. A relief module comprising a tubular body for allowing passage of bulk material,
   at least one lateral opening in the tubular body,
   a window to cover the at least one lateral opening, the window operating in a closed position which prevents bulk material from exiting through the lateral opening or in an open position allowing bulk material to exit through the lateral opening,
   the window having at least one portion made of filtering material which allows air to pass through and retain solid particles, when the window is in the closed position.

2. The relief module according to claim 1, wherein the relief module is configured to provide an opening of the window from the closed position to the open position when a level of bulk material contained in the tubular body falls upon the window and exert a force against the window that is higher than a force opposite to the opening of the window.

3. The relief module according to claim 1, wherein the window is fully made of filtering material.

4. The relief module according to claim 1, wherein the window comprises an edge, the edge having a housing with a pair of openings through which a rope is passed, the rope comprising a pair of extremities positioned outwards the openings of the housing.

5. The relief module according to claim 4, comprising a flap positioned around the lateral opening and extended outwards the tubular body, the flap having an external surface having a protrusion.

6. The relief module according to claim 5, wherein the closed position of the window is defined by tensioning the edge of the window against the flap of the lateral opening, due to a tying of the rope around the flap, the rope being positioned between the tubular body and the protrusion of the flap, said tensioning exerting a force opposite to releasing the window with respect to the protrusion.

7. The relief module according to claim 6, wherein the open position of the window is defined by the release of the window with respect to the protrusion of the flap of the lateral opening which occurs when a force exerted by bulk material against the window is higher than a force opposite to releasing the window.

8. The relief module according to claim 4, having a ring attached to the tubular body, the ring serving to receive a tying of the extremities of the rope, attaching the window to the ring.

9. The relief module according to claim 5, wherein the lateral opening has a super-elliptical shape, the flap and the window having a substantially corresponding shape.

10. A bulk material discharge device, which receives bulk material from a feeding system and discharges bulk material to a destination, the discharge device comprising a relief module as defined in claim 1.

11. The discharge device according to claim 10, comprising
    a rigid structure,
    a hopper connected to the rigid structure, the hopper formed by a wall having a top inlet opening and a bottom outlet opening,
    a valve body connected to the rigid structure and located in a centralized position inside the hopper,
    displacement means providing a relative movement between the hopper and the valve body in such a way to define a closed position on which the valve body is in contact with the wall of the hopper, preventing the discharge of bulk material through the bottom outlet opening, and an open position where the valve body is away from the wall of the hopper, allowing the bulk material to be discharged through the bottom outlet opening.

12. The discharge device according to claim 11, wherein the displacement means include the hopper connected to the rigid structure on a moving manner and the valve body connected to the rigid structure on a fixed manner.

13. The discharge device according to claim 12, wherein the hopper is connected to the rigid structure by means of springs tensioning the hopper against the valve body.

14. The discharge device according to claim 11, wherein the displacement means include the hopper connected to the rigid structure on a fixed manner and the valve body connected to the rigid structure on a moving manner.

15. The discharge device according to claim 11, comprising a tubular inlet nozzle with inclined walls converging towards a central region, a chinese hat located in the central region over the valve body and a deflector flap extended on an inclined manner from the rigid structure towards the valve body.

* * * * *